United States Patent [19]

Caine

[11] Patent Number: 5,400,239
[45] Date of Patent: Mar. 21, 1995

[54] POWER CONVERTER WITH PLURAL REGULATED OUTPUTS

[75] Inventor: Steven L. Caine, Lawrenceville, Ga.

[73] Assignee: Northern Telecom Limited, Montreal, Canada

[21] Appl. No.: 989,588

[22] Filed: Dec. 11, 1992

[51] Int. Cl.$^6$ .................................... H02M 3/335
[52] U.S. Cl. ................................ 363/67; 363/21; 363/86; 323/267
[58] Field of Search ............... 363/21, 8, 65, 67, 86; 323/266, 267, 268, 350; 307/31–41; H02M 3/335, 3/28

[56] References Cited

U.S. PATENT DOCUMENTS

| | | | |
|---|---|---|---|
| 4,928,049 | 5/1990 | Pletronbon et al. | 318/685 |
| 4,972,130 | 11/1990 | Rossie et al. | 318/293 |
| 5,038,264 | 8/1991 | Steigerwald | 363/21 |
| 5,045,712 | 9/1991 | Baggenstoss | 307/29 |
| 5,113,333 | 5/1992 | Ou | 363/25 |
| 5,225,789 | 7/1993 | Caine et al. | 330/10 |

FOREIGN PATENT DOCUMENTS 475465A 3/1992 Japan.

*Primary Examiner*—Steven L. Stephan
*Assistant Examiner*—Shawn Riley
*Attorney, Agent, or Firm*—Foley & Lardner

[57] ABSTRACT

A power converter comprises a power stage including a transformer, a pulse width modulator (PWM) for controlling the power stage, multiple output circuits providing individually regulated voltages, including switches for coupling the output circuits sequentially and cyclically to the power stage, and feedback circuitry for supplying respective feedback signals, each for a respective output circuit, as a control signal to the PWM synchronously with the coupling of the output circuits to the power stage, so that a single PWM and power stage serve for multiple output circuits. The converter can be a dc to dc converter or a four-quadrant switching amplifier. The PWM operates in current mode in conjunction with a current sensing resistor or transformer.

13 Claims, 2 Drawing Sheets

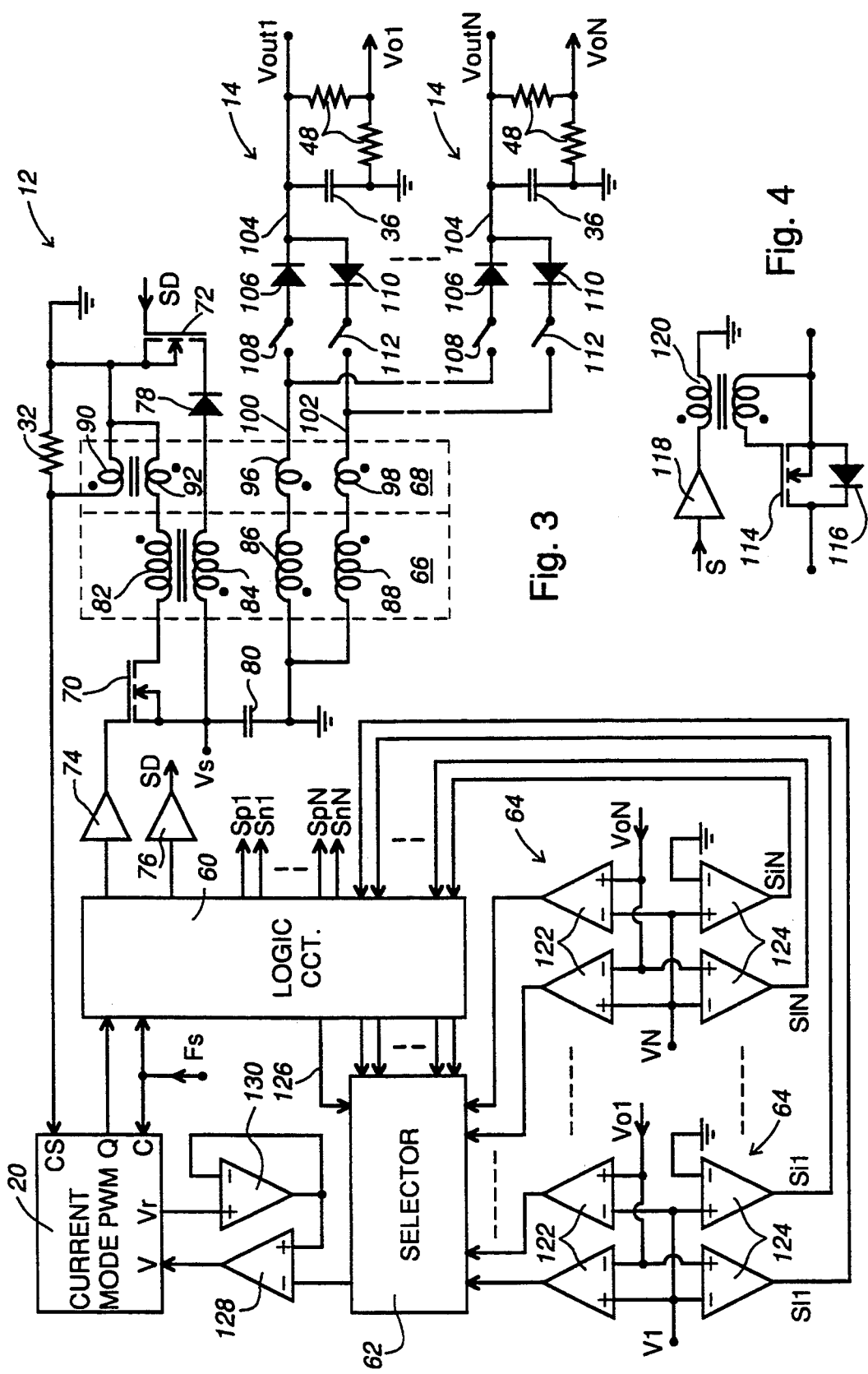

POWER CONVERTER WITH PLURAL REGULATED OUTPUTS

This invention relates to power converters, which term is used herein to embrace dc to ac converters, dc to dc converters, and four-quadrant switching amplifiers. In particular, the invention is concerned with a PWM (pulse width modulated) power converter for providing a plurality of regulated outputs.

CROSS-REFERENCE TO RELATED APPLICATION

Reference is directed to U.S. patent application No. 07/870,472 filed Apr. 17, 1992, now U.S. Pat. No. 5,225,789 by S. L. Caine et al. and entitled "Four Quadrant Current Mode Switching Amplifier", the entire disclosure of which is hereby incorporated heroin by reference.

BACKGROUND OF THE INVENTION

It is known to provide a power converter for generating a precisely regulated supply voltage for an electronic circuit in an efficient manner. Frequently, however, an electronic circuit will require several different regulated supply voltages for its desired operation.

To satisfy this requirement, a plurality of individual power converters can be used, but this involves disadvantages of high cost and space requirements. Alternatively, additional secondary windings of a power transformer of the power converter, one for each additional supply voltage or output of the converter, can be provided. This has the disadvantage that only one of the outputs is properly regulated, and the others are relatively unregulated. These unregulated outputs can subsequently be switched or linearly regulated individually, but this again results in disadvantages such as increased costs, space requirements, and decreased efficiency of the overall power converter.

An object of this invention is to provide an improved power converter providing a plurality of regulated outputs, in which these disadvantages are reduced or avoided.

SUMMARY OF THE INVENTION

According to one aspect this invention provides a power converter comprising: a power stage including a power transformer; a pulse width modulator responsive to a control signal for controlling the power stage; a plurality of output circuits each for providing a respective regulated voltage derived from the power transformer, the output circuits including switching means for coupling the output circuits sequentially and cyclically to the power stage; and feedback means for supplying a respective one of a plurality of feedback signals, each associated with a respective output circuit, as the control signal to the pulse width modulator synchronously with the coupling of the respective output circuit to the power stage.

By switching the output circuits and the associated feedback signals in synchronism, a plurality of individually regulated output voltages are produced using a single pulse width modulator and a single power stage.

Conveniently, where there are N output circuits, the converter includes means for frequency dividing a clock signal for the pulse width modulator by N, and the switching means of the output circuits are responsive to the frequency divided clock signal for coupling the output circuits to the power stage. In this case the feedback means preferably comprises N potential dividers each associated with a respective output circuit for providing a respective one of the feedback signals, and means for selecting one of the feedback signals as the control signal to the pulse width modulator in dependence upon the frequency divided clock signal.

The means for frequency dividing the clock signal can comprise a binary or ring counter whose outputs constitute the frequency divided clock signal and control the selecting means and the switching means of the output circuits accordingly.

One embodiment of the power converter takes the form of a four-quadrant switching amplifier, wherein: the power transformer comprises two windings for respectively supplying current from and returning current to a power source, and two secondary windings for providing respectively positive and negative voltages from the power stage, the power stage further including controlled switches in series with the first two windings of the power transformer;, each output circuit also includes smoothing means arranged to be coupled via the switching means to one of the two secondary windings of the power transformer to produce a respective output voltage of the output circuit from the smoothing means; and the feedback means is responsive, for each output circuit, to the feedback signal and to an input voltage both associated with the respective output circuit for producing the control signal for the pulse width modulator and control signals for the controlled switches and switching means so that the output voltage of the respective output circuit is an amplified version of the associated input voltage.

Preferably in this case the pulse width modulator comprises a current mode pulse width modulator including a current sensing input, and the power stage includes a current sensing transformer having a first winding coupled in series with the power transformer winding for supplying current from the power source, second and third windings each coupled in series with a respective one of the two secondary windings of the power transformer, and a fourth winding coupled to the current sensing input of the pulse width modulator.

Conveniently each output circuit includes a potential divider for producing as the feedback signal a respective feedback voltage representative of the respective output voltage; and the feedback means comprises, for each output circuit, means for producing two difference signals of opposite polarity in dependence upon differences between the respective feedback and input voltages, means for comparing the respective input voltage with the respective feedback voltage and with ground potential to produce slope and sign control binary signals respectively, and means for selecting one of the two opposite polarity difference signals, in dependence upon the slope and sign binary control signals and in synchronism with production of the control signals for the switching means of the respective output circuit, for producing the control signal for the pulse width modulator.

The feedback means conveniently includes means for producing the control signal for the pulse width modulator from a difference between the selected one of the two opposite polarity difference signals and a reference voltage.

Another aspect of this invention provides a four-quadrant switching amplifier comprising: a current mode pulse width modulator responsive to a control voltage, a sensed current signal, and a clock signal for providing a pulse width modulated output signal; a power stage comprising a power transformer, a current sensing transformer, and first and second switches, a first winding of the current sensing transformer being coupled to the pulse width modulator for supplying the sensed current signal thereto, the first switch, a first winding of the power transformer, and a second winding of the current sensing transformer being coupled in series and to a power source for supplying current to the power transformer when the first switch is closed, a second winding of the power transformer and the second switch being coupled in series and to the power source for returning current from the power transformer when the second switch is closed, third windings of the power and current sensing transformers being coupled in series for providing a positive voltage on a positive voltage output line of the power stage, and fourth windings of the power and current sensing transformers being coupled in series for providing a negative voltage on a negative voltage output line of the power stage; a plurality of output circuits each comprising an output voltage line, two controlled switches for coupling the output voltage line selectively to the positive and negative output voltage lines of the power stage, means for smoothing an output voltage on the output voltage line, and a potential divider for deriving a feedback voltage representative of the smoothed output voltage; and control and logic circuitry responsive to the clock signal, the output signal of the pulse width modulator, a plurality of input voltages each associated with a respective output circuit, and the respective feedback voltages for, sequentially and cyclically for the plurality of output circuits, controlling the switches of each output circuit, synchronously supplying as the control voltage for the pulse width modulator a voltage derived from the respective input and feedback voltages for the associated output circuit, and controlling the switches of the power stage, whereby the output voltage of each output circuit is an amplified version of the associated input voltage.

According to a further aspect this invention provides a power converter comprising: a current mode pulse width modulator responsive to a clock signal and having control and current sensing inputs and an output; a power stage including a switch controlled by the output of the pulse width modulator, a power transformer having a primary winding, coupled in series with the switch, and a secondary winding, and a current sensing resistor connected in series with the switch and the primary winding and coupled to the current sensing input of the pulse width modulator; a plurality of N output circuits each including smoothing means, a switch for coupling the smoothing means to the secondary winding of the power transformer to produce a respective output voltage from the smoothing means, and a potential divider for providing a feedback voltage dependent upon the output voltage; means for frequency dividing the clock signal of the pulse width modulator by N to produce a frequency divided clock signal; means for controlling the switches of the output circuits sequentially and cyclically in dependence upon the frequency divided clock signal; and selector means responsive to the frequency divided clock signal for supplying the feedback voltages to the control input of the pulse width modulator sequentially and cyclically in synchronism with the control of the switches of the output circuits to provide for regulation of each output voltage.

BRIEF DESCRIPTION OF THE DRAWINGS

The invention will be further understood from the following description with reference to the accompanying drawings, in which similar references are used in the different figures to denote similar components and in which:

FIG. 3 schematically illustrates a four-quadrant current mode switching amplifier for providing a plurality of regulated outputs in accordance with this invention; and FIG. 4 schematically illustrates a switch used in the switching amplifier of FIG. 3.

DETAILED DESCRIPTION

Figure 1:
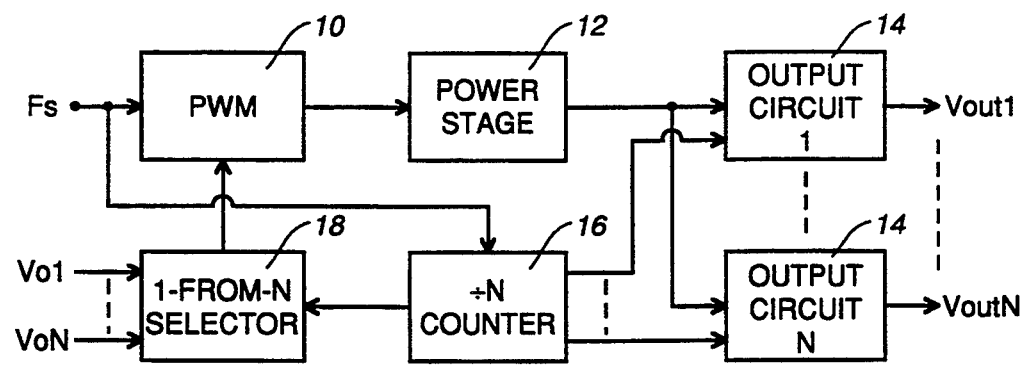
FIG. 1 is a block diagram of a power converter for providing a plurality of regulated outputs in accordance with this invention.

Referring to FIG. 1, a switching power converter in accordance with the invention comprises a pulse width modulator 10, a single power stage 12 controlled by the pulse width modulator, and a plurality of output circuits 14, numbered 1 to N (N being an integer of 2 or more) and of which only the stages 1 and N are represented in FIG. 1, coupled to the power stage for providing respective individually regulated output voltages Vout1 to VoutN. The power converter also comprises a counter 16 and a 1-from-N selector or analog multiplexer 18.

The pulse width modulator 10 is supplied in conventional manner with a clock signal Fs which defines a fundamental switching frequency of the power converter. This clock signal is also supplied to the counter 16, which counts cyclically to N and thus serves as a divide-by-N frequency divider for the clock signal. The counter 16 can conveniently comprise a binary counter which may include a count decoder, or a ring counter. Outputs of the counter 16 are supplied to the N output circuits 14, which are thereby controlled to be coupled sequentially and cyclically to the power stage 12. In synchronism with this control, the counter 16 also controls the selector 18 to supply a respective one of N feedback voltages Vo1 to VoN to a feedback control input of the pulse width modulator 10. The feedback voltages Vo1 to VoN are representative of the output voltages Vout1 to VoutN respectively, for example each being derived therefrom via a respective potential divider. Thus these feedback voltages are also supplied sequentially and cyclically to the pulse width modulator.

In consequence, all of the output voltages Vout1 to VoutN are individually regulated in a sequential and cyclic sequence, so that the power converter produces the N individually regulated output voltages using only a single pulse width modulator and a single power stage. Each regulated output voltage is thereby produced with an effective power converter switching frequency of Fs/N. Because the power converter thus provides a plurality of individually regulated output voltages, it provides better performance in terms of regulation and efficiency than the known arrangements using post-regulators, and is more economical in space and costs than a plurality of completely separate power converters.

Figure 2:
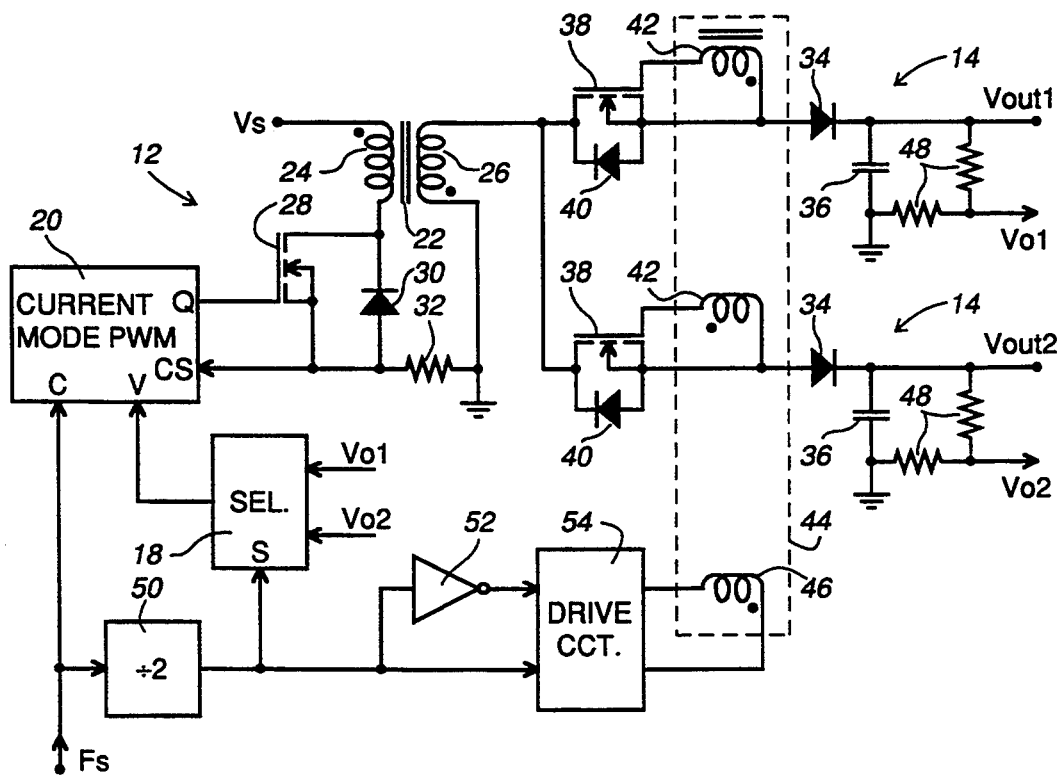
FIG. 2 is a circuit diagram schematically illustrating a power converter for providing two regulated outputs in accordance with this invention.

FIG. 2 illustrates a circuit diagram of a power converter, in the form of a dc to dc converter corresponding to the power converter of FIG. 1, for the case of N=2, i.e. having two output circuits providing two individually regulated output voltages Vout1 and Vout2.

As shown in FIG. 2, the pulse width modulator is constituted by a current mode pulse width modulator 20 having a clock signal input C, a feedback voltage or control input V, a current sensing input CS, and an output Q. The pulse width modulator 20 can for example comprise an integrated circuit such as a Siliconix type Si9110 device.

The power stage 12 comprises a power transformer 22 having a primary winding 24 and a secondary winding 26, a switch constituted by a switching field effect transistor (FET) 28 with a normally reverse biassed diode 30 connected in parallel with its controlled (source-drain) path, and a current sensing resistor 32. Dots adjacent the transformer windings 24 and 26 indicate their senses in conventional manner. The primary winding 24, controlled path of the FET 28, and resistor 32 are connected in series between a supply voltage Vs and circuit ground, with the junction between the resistor 32 and the FET 28 being connected to the input CS of the pulse width modulator 20. The FET 28 has its gate connected to the output Q of the pulse width modulator 20 to be controlled thereby. One end of the secondary winding is connected to the output circuits 14 as described further below, and the other end is grounded.

Each output circuit 14 comprises a diode 34 and a smoothing capacitor 36 which are coupled via the controlled path of a switching FET 38 to the non-grounded end of the secondary winding 26 to produce the respective output voltage Vout1 or Vout2 at output terminals of the output circuits. Each FET 38 has a normally reverse biassed diode 40 connected in parallel with its controlled path, and is controlled from a respective secondary winding 42, of a transformer shown within a broken line rectangle 44 and also having a primary winding 46, which is connected between its gate and source with the respective winding senses shown by dots. The output circuits 14 also include resistors 48 forming potential dividers which produce the feedback voltages Vo1 and Vo2 from the output voltages Vout1 and Vout2 respectively.

The clock signal Fs is supplied to the clock input C of the pulse width modulator 20 and to an input of a ÷2 frequency divider or counter 50, which can be constituted by a flip-flop. The output of the frequency divider 50 constitutes a frequency divided clock signal which is supplied to a selection control input S of the selector 18, to inputs of which the feedback voltages Vo1 and Vo2 are supplied and the output of which is supplied to the feedback voltage or control input C of the pulse width modulator 20. The frequency divided clock signal is also supplied, directly and via an inverter 52, to inputs of a drive circuit 54 having two complementary outputs which are connected to the two ends of the primary winding 46 of the transformer within the rectangle 44. The drive circuit 54 can comprise two current amplifiers.

It will be noted that the senses of the secondary windings 42 for the two output circuits are opposite to one another, so that the FETs 38 alternately couple the output circuits to the secondary winding 26 of the transformer with alternating states of the frequency divided clock signal, which also synchronously controls the selector 18 to feed back to the pulse width modulator 20 the appropriate feedback voltage Vo1 or Vo2. Thus the power converter of FIG. 2 operates in the manner described above in relation to FIG. 1, with each output voltage Vout1 and Vout2 being regulated individually on successive cycles of the clock signal Fs.

Referring now to FIG. 3, there is illustrated a power converter in the form of a four-quadrant current mode switching amplifier. The switching amplifier of FIG. 3 is based on the switching amplifier described in U.S. patent application No. 07/870,472 already referred to, but provides a plurality of regulated outputs in accordance with this invention in place of the single regulated output as described in that application.

The switching amplifier of FIG. 3 also has the same general form as the power converter of FIG. 1 in that it comprises a pulse width modulator 20 which is the same as that of FIG. 2 and for which a reference voltage output Vr is also shown in FIG. 3, a power stage 12, a plurality of N output circuits providing individually regulated output voltages Vout1 to VoutN, a ÷N counter which is effectively implemented within a logic circuit 60, and a selector which in FIG. 3 is referenced 62. The switching amplifier of FIG. 3 also has N control circuits 64, one associated with each output circuit 14, which are responsive to respective input control voltages V1 to VN and to respective feedback voltages Vo1 to VoN for determining the respective regulated output voltages Vout1 to VoutN, as further described below.

In the switching amplifier of FIG. 3, the power stage 12 comprises a power transformer 66 and a current sensing transformer 68 shown within broken line rectangles, switching FETs 70 and 72, which are referred to below as the primary and load drain FETs respectively and which are controlled by outputs of the logic circuit 60 via buffers 74 and 76 respectively (the output of the buffer 76 being shown as a signal SD for clarity in FIG. 3), a diode 78, a capacitor 80, and a current sensing resistor 32. The power transformer 66 has a primary winding 82, a load drain winding 84, and secondary windings 86 and 88, and the current sensing transformer 68 has four windings 90, 92, 96, and 98, the windings of the transformers being sensed as shown conventionally by dots adjacent the windings.

The controlled path of the primary FET 70 is connected in series with the power transformer primary winding 82 and the current sensing transformer winding 92 between a negative supply voltage Vs, for example a −48 volt battery supply of a telephone central office, and ground. The load drain winding 84 is connected in series with the diode 78 and the controlled path of the load drain Flit 72 between the supply voltage Vs and ground, and the capacitor 80 is connected between the supply voltage Vs and ground. The current sensing transformer winding 90 and the current sensing resistor 32 are connected in parallel between the current sense input CS of the pulse width modulator 20 and ground. The transformer windings 86 and 96 are connected in series with one polarity between a line 100 and ground, and the transformer windings 88 and 98 are connected in series with the opposite polarity between a line 102 and ground, the lines 100 and 102 constituting respectively positive and negative voltage output lines of the power stage 12.

Each output circuit 14 comprises an output voltage line 104 on which the respective one of the output voltages Vout1 to VoutN is produced, a diode 106 and a switch 108 connected in series with one polarity between the positive voltage line 100 and the line 104 for supplying positive output voltages, a diode 110 and a switch 112 connected in series with the opposite polarity between the negative voltage line 102 and the line 104 for supplying negative output voltages, and a smoothing capacitor 36 which is coupled between the line 104 and ground. Each output circuit 14 also includes resistors 48 forming a potential divider between the line 104 and ground for producing the respective one of the feedback voltages Vo1 to VoN.

The switches 108 and 112 are referred to as positive and negative switches respectively in view of the voltages which they carry to the output line 104, and are controlled by logic signal outputs Sp1, Sn1 to SpN, SnN of the logic circuit 60 for the N output circuits. Thus for example the signal Sp1 controls the positive switch 108, and the signal Sn1 controls the negative switch 112, of the first output circuit 14.

FIG. 4 illustrates the form of the switches 108 and 112, the respective control signal being represented by a signal S. The switch comprises a switching FET 114 whose controlled path is connected between the switch terminals (which are connected in the output circuit with appropriate polarity), with a normally reverse biassed diode 116 in parallel with this controlled path. The signal S is supplied from the logic circuit 60 via a buffer 118 to one end of the primary winding of a transformer 120 whose other end is grounded, and the secondary winding of the transformer 120 is coupled between the gate and source of the FET 114.

Each of the N control circuits 64 comprises two differential amplifiers 122 and two comparators 124. The amplifiers 122 are each supplied with the respective one of the feedback voltages Vo1 to VoN and with the respective one of the input control voltages V 1 to VN, and these amplifiers produce at their outputs positive and negative error voltage signals, i.e. difference signals of opposite polarity, which are supplied to the selector 62. The comparators 124 compare the respective input control voltage with the respective feedback voltage to produce a respective slope bit and with ground potential to produce a respective sign bit, thereby producing N slope bits S11 to S1N and N sign bits Si1 to SiN. These binary control signals are supplied through the logic circuit 60, where they are synchronized, to control inputs of the selector 62. The selector 62 is also supplied with an enable input from the logic circuit 60 via a line 126.

The logic circuit 60 supplies the synchronized slope and sign bits to the selector 62 in a sequence which is consistent with the ÷N function implemented in the logic circuit and in synchronism with its production of the switch control signals Sp 1, Sn1 to SpN, SnN for the N output circuits 14. Thus for example the logic circuit 60 produces from the slope and sign bits S11 and Si1 of the first control circuit 64 synchronized control bits for the selector 62, in accordance with which one of the error voltage signals at the outputs of the amplifiers 122 of this first control circuit 64 is supplied to the output of the selector 62 when this is enabled via the line 126, in synchronism with the production by the logic circuit 60 of the signal Sp1 or Sn1 for closing the switch 108 or 112 of the first output circuit 14. The same applies in respect of each of the other output circuits 14 and associated control circuits 64, for successive ones of N sequential phases of operation of the logic circuit, which phases are repeated cyclically.

In order to control or regulate the respective output voltage during each such phase, the output of the selector 62 is subtracted in a differential amplifier 128 from a reference voltage, produced by the pulse width modulator 20 at its output Vr and buffered by a unity gain amplifier 130, and the resulting control signal is supplied to the control voltage input V of the pulse width modulator 20. The pulse width modulator 20 and the logic circuit 60 are both supplied with the clock signal Fs as in the case of FIG. 2, and the output Q of the pulse width modulator 20 is supplied to the logic circuit 60 to determine, in association with the respective sign and slope bits, the control of the switching FETs 70 and 72 and the switches 108 and 112 of the respective output circuit 14.

Apart from the sequential and cyclical functioning of the switching amplifier of FIG. 3 as described above to share the pulse width modulator 20 and power stage 12 among a plurality of output circuits and thereby to provide for multiple individually regulated output voltages, the switching amplifier operates in a manner as fully described in U.S. patent application No. 07/870,472 already referred to.

Briefly, for each output circuit 14 the associated control circuit 64 produces error voltage signals and control bits which, when selected via the selector 62 in the synchronized manner described above, serve to control the pulse width modulator 20 to reduce the error voltage signals towards zero. For supplying current from the supply Vs and the capacitor 80 to an output circuit and a load connected thereto, the primary FET 70 is controlled by the pulse width modulation determined by the voltage at the input V of the pulse width modulator, and one of the switches 108 and 112 of the respective output circuit is closed. For sinking current from the output circuit and load to the capacitor 80, the load drain FET 72 is turned on and the appropriate one of the switches 108 and 112 of the respective output circuit is controlled by the pulse width modulation. In each case the pulse width modulation current through the respective winding 92, 96, or 98 of the current sensing transformer 68 is coupled to the winding 90 to provide current sensing feedback to the pulse width modulator 20. The switching amplifier thus operates in all four quadrants (current source or sink, and positive or negative polarity) to provide at each output an amplified output voltage which is precisely and individually regulated to be an amplified version of the respective input voltage.

By way of example of the versatility and usefulness of the switching amplifier of FIG. 3, it is observed that, with appropriate amplification factors determined for example by the potential dividers formed by the resistors 48, the amplifier could have three output circuits simultaneously providing individually regulated outputs (Vout1 to Vout3) of respectively a 200 volt peak sine wave, +100 volt dc, and −50 volt dc, in response to input control voltages (V1 to V3) of a 1 volt sine wave, +1 volt dc, and −1 volt dc respectively.

Although particular embodiments of the invention have been described in detail, it should be appreciated that numerous modifications, variations, and adaptations may be made without departing from the scope of the invention as defined in the claims. As one example of such a modification, it is observed that although as described above the clock signal is simply frequency divided to determine the time phases for the different output circuits in an equal manner, such an equal distribution is not essential to the invention and different time periods or multiples of the period of the clock signal Fs may instead be used for different output circuits if desired, the output circuits and their feedback arrangements still operating in synchronism as described above.

What is claimed is:

1. A power converter comprising:
   a power stage including a power transformer;
   a pulse width modulator responsive to a control signal for controlling the power stage;
   a plurality of output circuits each for providing a respective regulated voltage derived from the power transformer, the output circuits including switching means for coupling the output circuits sequentially and cyclically to the power stage; and
   feedback means for selecting one of a plurality of feedback signals, each associated with a respective output circuit, as the control signal to the pulse width modulator sequentially and cyclically with the coupling of the respective output circuit to the power stage.

2. A power converter as claimed in claim 1 wherein the pulse width modulator comprises a current mode pulse width modulator including a current sensing input, and the power stage includes current sensing means coupled to the current sensing input.

3. A power converter as claimed in claim 1 wherein there are N output circuits, the converter includes means for frequency dividing a clock signal for the pulse width modulator by N, and the switching means of the output circuits are responsive to the frequency divided clock signal for coupling the output circuits to the power stage.

4. A power converter as claimed in claim 3 wherein the pulse width modulator comprises a current mode pulse width modulator including a current sensing input, and the power stage includes current sensing means coupled to the current sensing input.

5. A power converter as claimed in claim 3 wherein the feedback means comprises N potential dividers each associated with a respective output circuit for providing a respective one of the feedback signals, and means for selecting one of the feedback signals as the control signal to the pulse width modulator in dependence upon the frequency divided clock signal.

6. A power converter as claimed in claim 5 wherein N=2.

7. A power converter as claimed in claim 5 wherein the pulse width modulator comprises a current mode pulse width modulator including a current sensing input, and the power stage includes current sensing means coupled to the current sensing input.

8. A power converter as claimed in claim 1 in the form of a four-quadrant switching amplifier, wherein:
   the power transformer comprises two windings for respectively supplying current from and returning current to a power source, and two secondary windings for providing respectively positive and negative voltages from the power stage, the power stage further including controlled switches in series with the first two windings of the power transformer;
   each output circuit also includes smoothing means arranged to be coupled via the switching means to one of the two secondary windings of the power transformer to produce a respective output voltage of the output circuit from the smoothing means; and
   the feedback means is responsive, for each output circuit, to the feedback signal and to an input voltage both associated with the respective output circuit for producing the control signal for the pulse width modulator and control signals for the controlled switches and switching means so that the output voltage of the respective output circuit is an amplified version of the associated input voltage.

9. A power converter as claimed in claim 8 wherein the pulse width modulator comprises a current mode pulse width modulator including a current sensing input, and the power stage includes a current sensing transformer having a first winding coupled in series with the power transformer winding for supplying current from the power source, second and third windings each coupled in series with a respective one of the two secondary windings of the power transformer, and a fourth winding coupled to the current sensing input of the pulse width modulator.

10. A power converter as claimed in claim 8 wherein:
    each output circuit includes a potential divider for producing as the feedback signal a respective feedback voltage representative of the respective output voltage; and
    the feedback means comprises, for each output circuit, means for producing two difference signals of opposite polarity in dependence upon differences between the respective feedback and input voltages, means for comparing the respective input voltage with the respective feedback voltage and with ground potential to produce slope and sign control binary signals respectively, and means for selecting one of the two opposite polarity difference signals, in dependence upon the slope and sign binary control signals and in synchronism with production of the control signals for the switching means of the respective output circuit, for producing the control signal for the pulse width modulator.

11. A power converter as claimed in claim 10 wherein the feedback means includes means for producing the control signal for the pulse width modulator from a difference between the selected one of the two opposite polarity difference signals and a reference voltage.

12. A four-quadrant switching amplifier comprising:
    a current mode pulse width modulator responsive to a control voltage, a sensed current signal, and a clock signal for providing a pulse width modulated output signal;
    a power stage comprising a power transformer, a current sensing transformer, and first and second switches, a first winding of the current sensing transformer being coupled to the pulse width modulator for supplying the sensed current signal thereto, the first switch, a first winding of the power transformer, and a second winding of the current sensing transformer being coupled in series and to a power source for supplying current to the power transformer when the first switch is closed, a second winding of the power transformer and the second switch being coupled in series and to the power source for returning current from the power transformer when the second switch is closed, third windings of the power and current sensing transformers being coupled in series for providing a positive voltage on a positive voltage output line of the power stage, and fourth windings of the power and current sensing transformers being coupled in series for providing a negative voltage on a negative voltage output line of the power stage;

a plurality of output circuits each comprising an output voltage line, two controlled switches for coupling the output voltage line selectively to the positive and negative output voltage lines of the power stage, means for smoothing an output voltage on the output voltage line, and a potential divider for deriving a feedback voltage representative of the smoothed output voltage; and control and logic circuitry responsive to the clock signal, the output signal of the pulse width modulator, a plurality of input voltages each associated with a respective output circuit, and the respective feedback voltages for, sequentially and cyclically for the plurality of output circuits, controlling the switches of each output circuit, synchronously supplying as the control voltage for the pulse width modulator a voltage derived from the respective input and feedback voltages for the associated output circuit, and controlling the switches of the power stage, whereby the output voltage of each output circuit is an amplified version of the associated input voltage.

13. A power converter comprising:

a current mode pulse width modulator responsive to a clock signal and having control and current sensing inputs and an output;

a power stage including a switch controlled by the output of the pulse width modulator, a power transformer having a primary winding, coupled in series with the switch, and a secondary winding, and a current sensing resistor connected in series with the switch and the primary winding and coupled to the current sensing input of the pulse width modulator;

a plurality of N output circuits each including smoothing means, a switch for coupling the smoothing means to the secondary winding of the power transformer to produce a respective output voltage from the smoothing means, and a potential divider for providing a feedback voltage dependent upon the output voltage;

means for frequency dividing the clock signal of the pulse width modulator by N to produce a frequency divided clock signal;

means for controlling the switches of the output circuits sequentially and cyclically in dependence upon the frequency divided clock signal; and selector means responsive to the frequency divided clock signal for supplying the feedback voltages to the control input of the pulse width modulator sequentially and cyclically in synchronism with the control of the switches of the output circuits to provide for regulation of each output voltage.

* * * * *